(12) United States Patent
Fujihara et al.

(10) Patent No.: US 11,239,014 B2
(45) Date of Patent: Feb. 1, 2022

(54) RARE-EARTH MAGNET AND LINEAR MOTOR USING SAME

(71) Applicant: NITTO DENKO CORPORATION, Osaka (JP)

(72) Inventors: Makoto Fujihara, Osaka (JP); Toshinobu Hoshino, Osaka (JP); Shoichiro Saito, Osaka (JP); Kenichi Fujikawa, Osaka (JP)

(73) Assignee: NITTO DENKO CORPORATION, Ibaraki (JP)

( * ) Notice: Subject to any disclaimer, the term of this patent is extended or adjusted under 35 U.S.C. 154(b) by 896 days.

(21) Appl. No.: 15/560,812

(22) PCT Filed: Mar. 24, 2016

(86) PCT No.: PCT/JP2016/059390
§ 371 (c)(1),
(2) Date: Sep. 22, 2017

(87) PCT Pub. No.: WO2016/152975
PCT Pub. Date: Sep. 29, 2016

(65) Prior Publication Data
US 2018/0114620 A1 Apr. 26, 2018

(30) Foreign Application Priority Data
Mar. 24, 2015 (JP) .............................. JP2015-061081
Feb. 9, 2016 (JP) .............................. JP2016-022770

(51) Int. Cl.
*H01F 7/02* (2006.01)
*H02K 41/03* (2006.01)
(Continued)

(52) U.S. Cl.
CPC ............. *H01F 7/02* (2013.01); *H01F 13/003* (2013.01); *H01F 41/0273* (2013.01);
(Continued)

(58) Field of Classification Search
CPC .. H01F 13/003; H01F 1/0577; H01F 41/0273; H01F 41/028; H01F 7/02; H02K 15/03; H02K 41/02; H02K 41/03
See application file for complete search history.

(56) References Cited

U.S. PATENT DOCUMENTS

| | | | |
|---|---|---|---|
| 5,808,381 | A | 9/1998 | Aoyama et al. |
| 6,304,162 | B1 | 10/2001 | Nakatsuka et al. |
(Continued)

FOREIGN PATENT DOCUMENTS

| | | | |
|---|---|---|---|
| CN | 1618161 | A | 5/2005 |
| CN | 1784819 | A | 6/2006 |
(Continued)

OTHER PUBLICATIONS

Chinese Office Action dated Sep. 29, 2019 for corresponding Chinese Application No. 201680017695.1, citing the above references, with English Machine translation.
(Continued)

*Primary Examiner* — Bernard Rojas
(74) *Attorney, Agent, or Firm* — Hauptman Ham, LLP

(57) ABSTRACT

Provided are a rare-earth magnet capable of realizing a high magnetic flux amount without using any back yoke, and a linear motor comprising a movable element using the rare-earth permanent magnet. A rare-earth permanent magnet-forming sintered body for forming a permanent magnet is integrally sintered while being formed into a given three-dimensional shape with a lengthwise cross-section having a first surface extending in a length direction thereof, a second surface lying at a distance from the first surface in a thickness direction thereof and extending in the length direction, and an edge surface of each of lengthwise opposite ends thereof. This sintered body is formed such that easy magnetization axes of the magnet material particles included (Continued)

in a central region thereof are oriented in such a manner as to be directed along an arch-shaped path.

10 Claims, 9 Drawing Sheets

(51) Int. Cl.
*H02K 15/03* (2006.01)
*H01F 41/02* (2006.01)
*H01F 13/00* (2006.01)
*H02K 41/02* (2006.01)
*H01F 1/057* (2006.01)

(52) U.S. Cl.
CPC ............ *H02K 15/03* (2013.01); *H02K 41/02* (2013.01); *H02K 41/03* (2013.01); *H01F 1/0577* (2013.01); *H01F 41/028* (2013.01)

(56) References Cited

U.S. PATENT DOCUMENTS

| | | | |
|---|---|---|---|
| 7,382,067 | B2 | 6/2008 | Nakagawa et al. |
| 7,476,990 | B2 | 1/2009 | Nakagawa et al. |
| 7,560,841 | B2 | 7/2009 | Honkura et al. |
| 9,281,107 | B2 | 3/2016 | Taihaku et al. |
| 9,991,033 | B2 | 6/2018 | Taihaku et al. |
| 9,991,034 | B2 | 6/2018 | Taihaku et al. |
| 2003/0117026 | A1 | 6/2003 | Korenaga |
| 2005/0057101 | A1 | 3/2005 | Nakagawa et al. |
| 2005/0076973 | A1 | 4/2005 | Masuzawa et al. |
| 2006/0113857 | A1 | 6/2006 | Honkura et al. |
| 2008/0197719 | A1 | 8/2008 | Nakagawa et al. |
| 2008/0231989 | A1 | 9/2008 | Oki et al. |
| 2009/0127960 | A1 | 5/2009 | Kawamura et al. |
| 2011/0012463 | A1 | 1/2011 | Duncan et al. |
| 2012/0262019 | A1 | 10/2012 | Smith et al. |
| 2013/0285778 | A1 | 10/2013 | Taihaku et al. |
| 2013/0328453 | A1 | 12/2013 | Duncan et al. |
| 2014/0145808 | A1 | 5/2014 | Kume et al. |
| 2016/0141100 | A1 | 5/2016 | Taihaku et al. |
| 2016/0196903 | A1 | 7/2016 | Taihaku et al. |

FOREIGN PATENT DOCUMENTS

| | | |
|---|---|---|
| DE | 3913276 | 10/1990 |
| EP | 1063659 A2 | 12/2000 |
| JP | S57-2801 A | 1/1982 |
| JP | S61-69104 A | 4/1986 |
| JP | 62-245604 A | 10/1987 |
| JP | H02-308512 A | 12/1990 |
| JP | H08-107665 | 4/1996 |
| JP | 2001-006924 | 1/2001 |
| JP | 2001-76925 A | 3/2001 |
| JP | 2003-189589 | 7/2003 |
| JP | 2003-318012 A | 11/2003 |
| JP | 2004-031780 A | 1/2004 |
| JP | 2005-44820 | 2/2005 |
| JP | 2006-087204 A | 3/2006 |
| JP | 3864986 | 1/2007 |
| JP | 2008-252968 A | 10/2008 |
| JP | 2009-142144 A | 6/2009 |
| JP | 2009-254143 A | 10/2009 |
| JP | 2009-284740 A | 12/2009 |
| JP | 2010-098080 A | 4/2010 |
| JP | 2010-104136 A | 5/2010 |
| JP | 2010-200459 A | 9/2010 |
| JP | 2011-109004 A | 6/2011 |
| JP | 2013-191611 A | 9/2013 |
| JP | 2015-032669 A | 2/2015 |
| TW | 201301312 A | 1/2013 |
| WO | 94/14175 A1 | 6/1994 |
| WO | 2012/176509 A1 | 12/2012 |
| WO | 2013175730 A1 | 11/2013 |
| WO | 2015-015586 A1 | 2/2015 |

OTHER PUBLICATIONS

Chinese Office Action dated Jan. 9, 2019 for corresponding Chinese Application No. 201680017695.1, citing the above references.
Japanese Office Action dated Sep. 9, 2019 for corresponding Japanese Application No. 2017-508423, citing the above references with English translation.
Japanese Office Action dated Sep. 17, 2019 for corresponding Japanese Application No. 2017-508424, citing the above references with English translation.
Taiwanese Office Action dated Dec. 26, 2018 for corresponding Taiwanese Application No. 105108833, citing the above references.
The extended European Search Report for corresponding European application No. 16768878.7 dated Nov. 29, 2018, citing the above references.
Japanese Office Action dated Jun. 10, 2019 for corresponding Japanese Application No. 2017-508425, citing the above references.
International Search Report and Written Opinion of the International Searching Authority dated Jun. 21, 2016, which issued during prosecution of International Application No. PCT/JP2016/059390.
Japanese Office Action dated Aug. 26, 2019 for corresponding Japanese Application No. 2017-508422 and its English translation.
Japanese Office Action dated Jun. 1, 2020 in connection with the counterpart Japanese Patent Application No. 2017-508422, with English Machine Translation, citing the above reference(s).
Japanese Office Action dated Jun. 1, 2020 in connection with the counterpart Japanese Patent Application No. 2017-508423, with English Machine Translation.
Japanese Office Action dated Jun. 1, 2020 in connection with the counterpart Japanese Patent Application No. 2017-508424, with English Machine Translation.
Japanese Office Action dated Feb. 28, 2020 corresponding to Japanese Application No. 2018-101818, citing the Above reference.
Office Action issued for corresponding Japanese Patent Application No. 2018-101818 dated Oct. 1, 2020, along with an English machine translation.
Japanese Office Action dated Mar. 9, 2021, in connection with the Japanese Patent Application No. 2017-508422 citing the above reference(s).
Japanese Office Action dated Mar. 9, 2021, in connection with the Japanese Patent Application No. 2017-508423 citing the above reference(s).
Office Action issued for corresponding Japanese Patent Application No. 2021-011009 dated Oct. 4, 2021, along with an English machine translation.
Communication pursuant to Article 94(3) EPC issued for corresponding European Patent Application No. 16 768 878.7 dated Oct. 7, 2021.

FIG.8
(a)
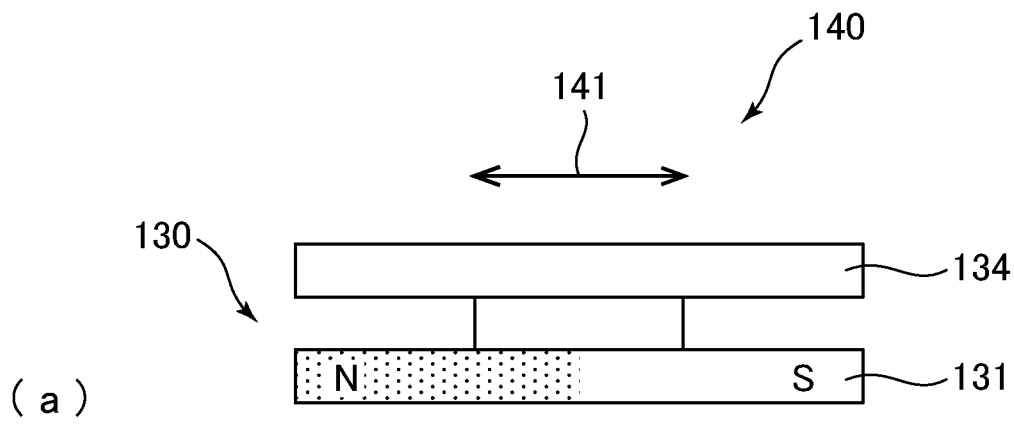
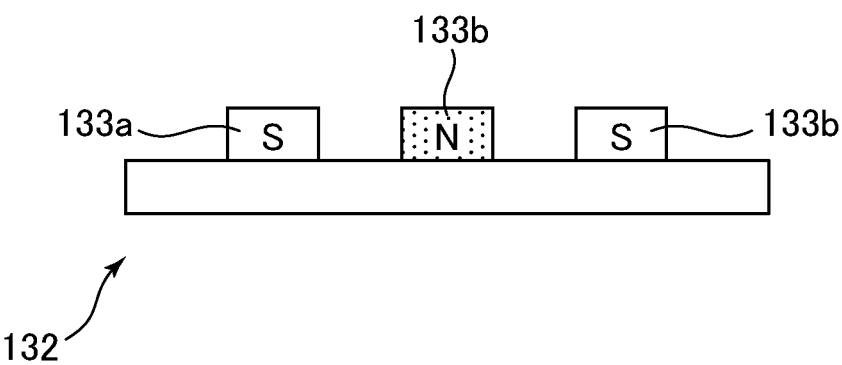
(b)
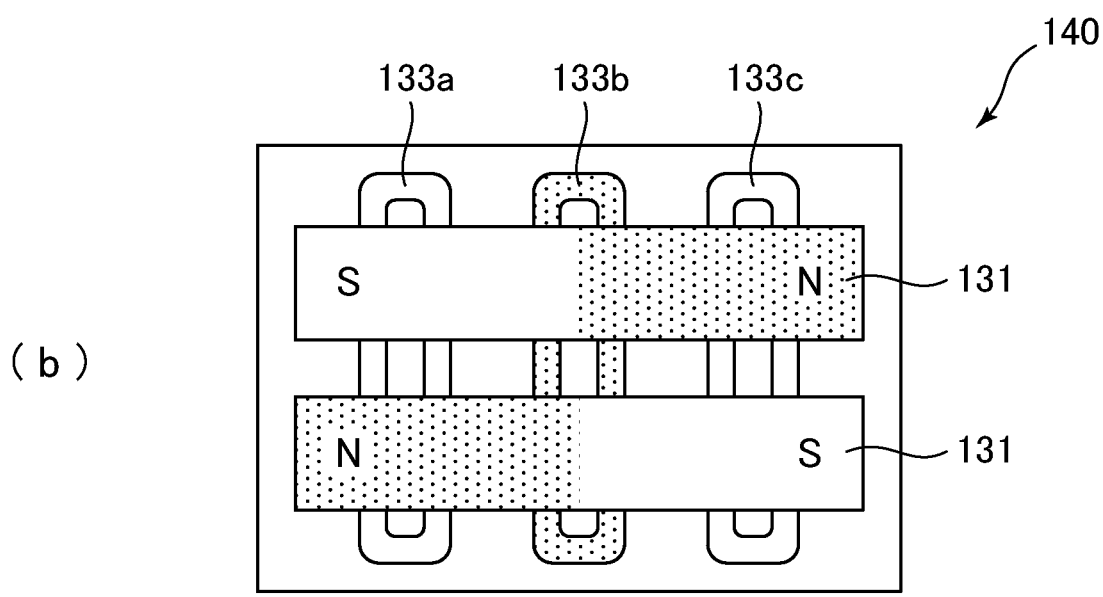

US 11,239,014 B2

RARE-EARTH MAGNET AND LINEAR MOTOR USING SAME

RELATED APPLICATIONS AND INCORPORATION BY REFERENCE

The present patent application is filed pursuant to 35 U.S.C. § 371 as a U.S. National Phase Application of International Patent Application No. PCT/JP2016/059390 filed on Mar. 24, 2016, claiming the benefit of priority to Japanese Patent Application Nos. 2015-061081 filed on Mar. 24, 2015 and 2016-022770 filed Feb. 9, 2016. The International Application was published as WO 2016/152975 on Sep. 29, 2016. The contents of each of the aforementioned patent applications are herein incorporated by reference in their entirety.

TECHNICAL FIELD

The present invention relates to a rare-earth magnet, and a linear motor using the rare-earth magnet. In particular, the present invention relates to a rare-earth magnet capable of generating a high magnetic flux density without using any back yoke.

BACKGROUND ART

Generally, a linear motor comprises a stator, and a movable element disposed to be opposed to the stator. In JP 2003-189589 A (Patent Document 1), there is described a linear motor in which a stator is composed of an electromagnet comprising a plurality of armature cores arranged in a moving direction of a movable element, and a plurality of coils each wound around a respective one of the armature cores, wherein the movable element is composed of a permanent magnet unit. The permanent magnet unit serving as the movable element is in the form of a magnet array composed of a plurality of permanent magnets arranged in parallel with each other in a cross direction with respect to the moving direction of the movable element, wherein adjacent ones of the permanent magnets are arranged such that opposed magnetic poles thereof have opposite polarities. Further, a back yoke is attached to a surface of the plurality of permanent magnets composing the magnet array, on a back side thereof, i.e., on an opposite side with respect to the stator, in order to circulate a magnetic flux of the magnet array between N- and S-poles. The Patent Document 1 explains that the configuration of the linear motor described in the Patent Document 1 has an advantage of being able to reduce the weight of the movable element, as configured to the case where the movable element is composed of a coil unit Although not described in the Patent Document 1, a linear motor in which a permanent magnet of a movable element is formed of a rare-earth magnet material having high holding force, such as an Nd—Fe—B based magnet, to achieve a reduction in size and weight of the magnet, is used in applications requiring a small, lightweight motor, such as a reciprocating member. In such a configuration using a rare-earth magnet, a back yoke is attached as an indispensable component to a permanent magnet.

CITATION LIST

Parent Document

Patent Document 1: JP 2003-189589A

SUMMARY OF INVENTION

Technical Problem

The permanent magnet unit used as the movable element in the linear motor described in the Patent Document 1 needs to be provided with a back yoke in order to circulate the magnetic flux of the magnet array between N- and S-poles, a mentioned above.

It is a primary object of the present invention to provide a rare-earth magnet capable of realizing a high magnetic flux amount without using any back yoke.

Solution to Technical Problem

In a first aspect, the present invention provides a rare-earth permanent magnet-forming sintered body. This rare-earth permanent magnet-forming sintered body can be formed as a permanent magnet through magnetization. Thus, in a second aspect, the present invention provides a rare-earth permanent magnet. Further, in a third aspect, the present invention provides a linear motor comprising a movable element using the rare-earth permanent magnet.

The rare-earth permanent magnet-forming sintered body comprising magnet material particles containing a rare-earth substance. The magnet material particles are integrally sintered while being formed into a given three-dimensional shape with a lengthwise cross-section having a first surface extending in a length direction thereof, a second surface lying at a distance from the first surface in a thickness direction thereof and extending in the length direction, and an edge surface of each of lengthwise opposite ends thereof. In a central region of the sintered body located between a first end region and a second end region on the respective sides of the opposite ends, when viewed in the length direction, easy magnetization axes of the magnet material particles included in the central region are oriented in such a manner as to be directed along a path which enters an inside of the sintered body from the second surface at a position located on the side of the first end region with respect to a lengthwise center line of the central region passing through a lengthwise center of the central region and extending in a direction perpendicular to the first surface, and, after intersecting the lengthwise center line in the length direction, extends toward the second surface at a position located on the side of the second end region with respect to the lengthwise center line of the central region.

Further, the first end region, easy magnetization axes of the magnet material particles included in the first end region are oriented in such a manner as to be directed along a path which enters the inside of the sintered body from the second surface and extends toward the first surface. In the second end region, easy magnetization axes of the magnet material particles included in the second end region are oriented in such a manner as to be directed along a path which enters the inside of the sintered body from the first surface and extends toward the second surface.

In the above sintered body, in a corner area of the central region adjacent to each of the first and second end regions and close to the first surface, easy magnetization axes of the magnet material particles included in the corner area are oriented along a curved path corresponding to the above arch-shaped path.

In one preferred embodiment of the first aspect of the present invention, the easy magnetization axes of the magnet material particles included in the first end region are oriented in parallel alignment in such a manner as to be directed in a direction approximately orthogonal to the first surface. In another preferred embodiment of the first aspect of the present invention, the easy magnetization axes of the magnet material particles included in the first end region are oriented, in an area adjacent to the central region, in such a manner as to be directed along a curved path in which direction of the path gradually changes such that it is directed toward the central region as it becomes closer to the first surface. In yet another preferred embodiment of the first aspect of the present invention, the easy magnetization axes of the magnet material particles included in the second end region are oriented, in an area adjacent to the central region, in such a manner as to be directed along a curved path in which direction of the path gradually changes such that it is directed away from the central region, as it becomes farther away from first surface.

In still another preferred embodiment of the first aspect of the present invention, the easy magnetization axes of the magnet material particles included in the first and second end regions are oriented in parallel alignment in such a manner as to be directed in a direction approximately orthogonal to the first surface. In the central region, the easy magnetization axes of the magnet material particles included in the central region are oriented such that, when the lengthwise center line of the central region is set as an origin in the length direction, and a distance measured from the lengthwise center line in a direction toward the second end region, a distance measured from the lengthwise center line in a direction toward the first end region, and a distance from the lengthwise center line to a boundary between the central region and each of the first and second end regions are denoted, respectively, by +b, −b and bmax, an orientation angle θ defined as an angle between an orientation direction of each of the easy magnetization axes and the first surface satisfies the following relationship: $\theta(°)=(b/bmax) \times c \times 90$ (where: c denotes a constant; and the orientation angle θ has a positive value and a negative value, respectively, in a counterclockwise direction and in a clockwise direction, wherein: $\theta=90°$ when $(b/bmax) \times c <-1$; and $\theta=90°$ when $(b/bmax) \times c > 1$). In this case, the orientation angle is approximately constant in the thickness direction at positions where the distance b from the lengthwise center line has a same value.

In yet still another preferred embodiment of the first aspect of the present invention, the c in the above formulas defining the orientation angle θ denotes a variable coefficient, instead of a constant. In this case, the c varies to gradually increase along one direction from the first surface toward the second surface in the thickness direction, in such a manner that it becomes minimum at the first surface, and becomes maximum at the second surface. Specifically, in the above formulas defining the orientation angle θ, $\theta=-90°$ when $(b/bmax) \times c<-1$, and $\theta=90°$ when $(b/bmax) \times c>1$. Further, the c varies to gradually increase along one direction from the first surface toward the second surface in the thickness direction, in such a manner that it becomes minimum at the first surface, and becomes maximum at the second surface.

In another further preferred embodiment of the first aspect of the present invention, the magnet material particles are formed of Nd—Fe—B based magnet material.

In the second aspect, the present invention provides a rare-earth permanent magnet produced by magnetizing the above rare-earth permanent magnet-forming sintered body. Further, in the third aspect, the present invention provides a linear motor comprising a movable element having at least one rare-earth permanent magnet produced in the above manner, and a plurality of stationary magnetic poles arranged at a distance with respect to the first surface of the rare-earth permanent magnet. Preferably, in this linear motor, the rare-earth permanent magnet of the movable element is disposed such that the length direction thereof intersects a moving direction of the movable element.

Effect of Invention

In the present invention, easy magnetization axes of the magnet material particles as a component of the rare-earth permanent magnet-forming sintered body are oriented in the above manner, so that magnetization directions of a rare-earth permanent magnet produced by magnetizing the sintered body conforms to the orientation directions of the easy magnetization axes. Therefore, the produced rare-earth permanent magnet generates a magnetic flux circulating between lengthwise opposite ends of the central region. This makes it possible to obtain a sufficient magnetic flux density without using any back yoke.

BRIEF DESCRIPTION OF DRAWINGS

FIG. 1 depicts an arrangement of typical permanent magnet units usable as a movable element of a linear motor for driving a reciprocating member, wherein FIG. 1(a) is a top plan view, and FIG. 1(b) is a side view.

FIG. 3 is a schematic lengthwise sectional view generally depicting orientations of easy magnetization axes of magnet material particles in a permanent magnet-forming sintered body according to the present invention, wherein: FIGS. 3(a), 1(b), 1(c) and 1(d) depict, respectively, one embodiment of the present invention, another embodiment of the present invention, a yet another embodiment of the present invention capable of preferably obtaining a high peak magnetic flux density, and a modification of the embodiment in FIG. 3(c); and FIGS. 3(e) and 3(f) are graphs presenting, respectively, a relation ship between an orientation angle of each easy magnetization axis of magnet material particles and a lengthwise position, in the embodiment in FIG. 3(c), and a relation ship between an orientation angle of each easy magnetization axis of magnet material particles and a thicknesswise position, in the embodiment in FIG. 3(d).

FIG. 4 relates to the embodiment in FIG. 3(a), wherein FIG. 4(a) is a side view depicting details of orientations of easy magnetization axes in a permanent magnet-forming sintered body, and FIG. 4(b) is a graph presenting a magnetic flux density of a permanent magnet produced by magnetizing the permanent magnet-forming sintered body, in comparison with a conventional magnet.

FIG. 7 is a schematic diagram depicting a production process of the permanent magnet-forming sintered body depicted in FIG. 4(a), wherein FIGS. 7(a) to (d) depict respective steps for forming a green sheet.

FIG. 8 depicts one example of a small-size linear motor comprising a permanent magnet formed by magnetizing a rare-earth permanent magnet-forming sintered body according to one embodiment of the present invention, wherein FIG. 8(a) is a side view, and FIG. 8(b) is a top plan view.

FIG. 9 is a schematic diagram depicting another method for producing permanent magnet-forming sintered bodies according to some embodiments of the present invention, wherein FIGS. 9(a), 9(b), 9(c), 9(d) and 9(e) depict respective steps of the production.

DESCRIPTION OF EMBODIMENTS

Figure 1:
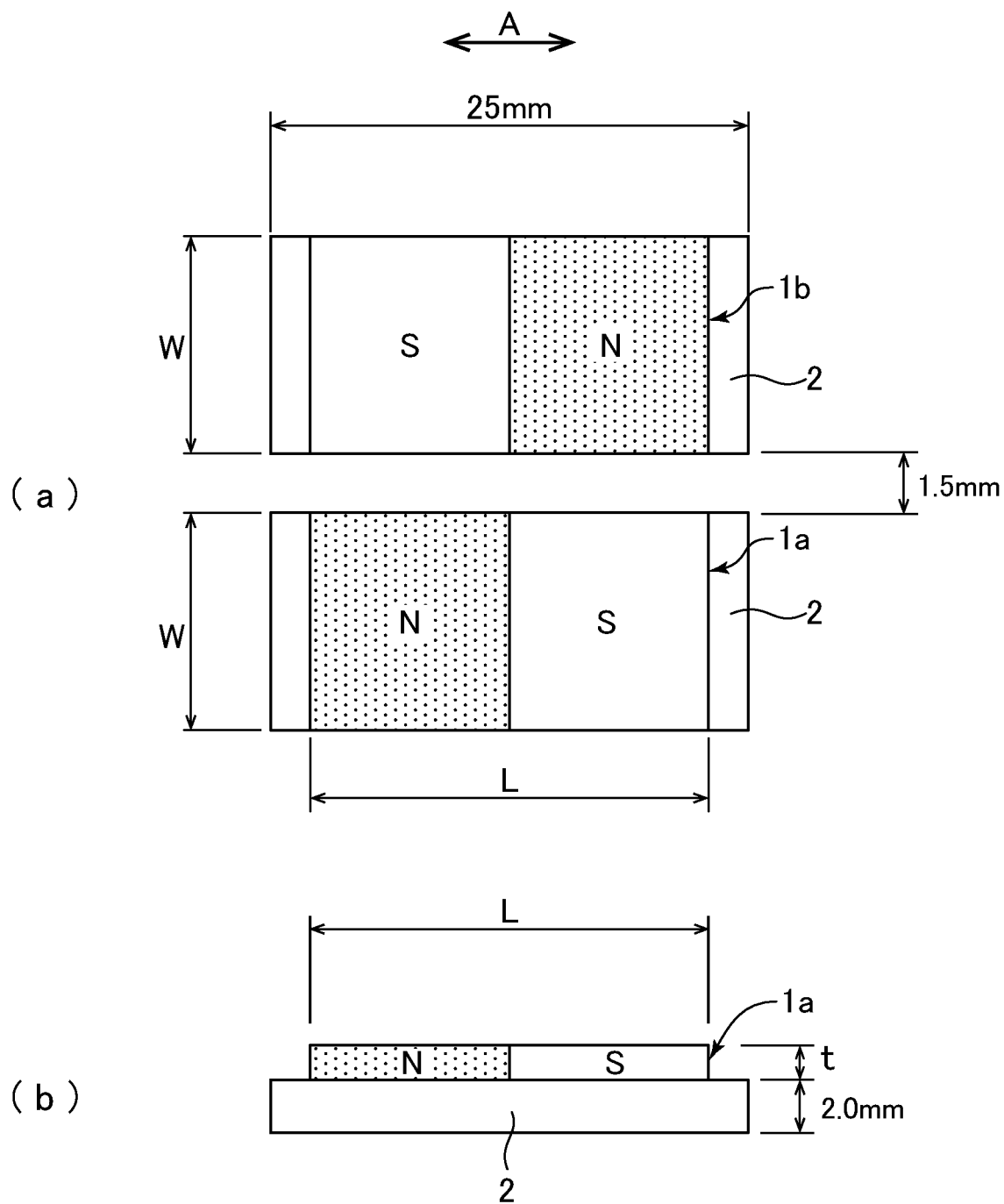

FIG. 1 depicts a magnet unit 1 comprising two permanent magnets 1a, 1b arranged as in a conventional linear motor. Each of the permanent magnets 1a, 1b has a length L, a width W, and a thickness t. In a state in which this magnet unit 1 is assembled as part of a linear motor to serve as a movable element, a moving direction of the movable element is indicated by the double arrowed line A in FIG. 1(a).

Each of the permanent magnets 1a, 1b is configured such that it has an S-pole at one of opposite ends in a length direction thereof, and an N-pole at the other end, and disposed such that the length direction becomes parallel to the moving direction of the movable element. A back yoke 2 is attached to the permanent magnets 1a, 1b. In the case where the magnet unit 1 is used in a typical reciprocating member, each of the permanent magnets 1a, 1b is formed to have a length L of 20 mm, a width W of 8 mm, and thickness t of 1.3 mm. On the other hand, the back yoke 2 is formed to have a parallelepiped shape having a length L of 25 mm which is slightly greater than that of each of the permanent magnets 1a, 1b, a width W of 8 mm, and a thickness t of 2.0 mm.

Figure 2:
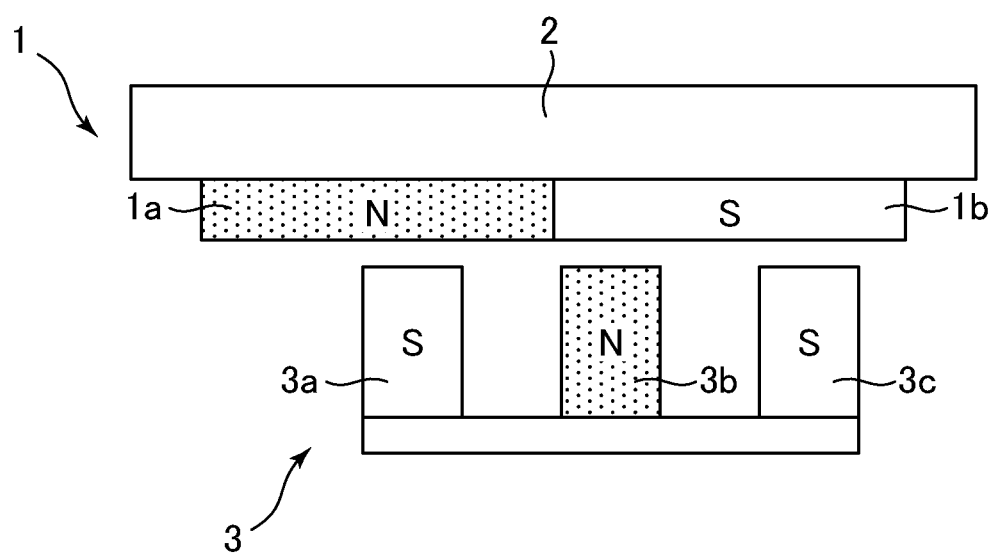
FIG. 2 is a schematic diagram depicting a state in which the permanent magnet units depicted in FIG. 1 is assembled as part of a linear motor.
Figure 3:
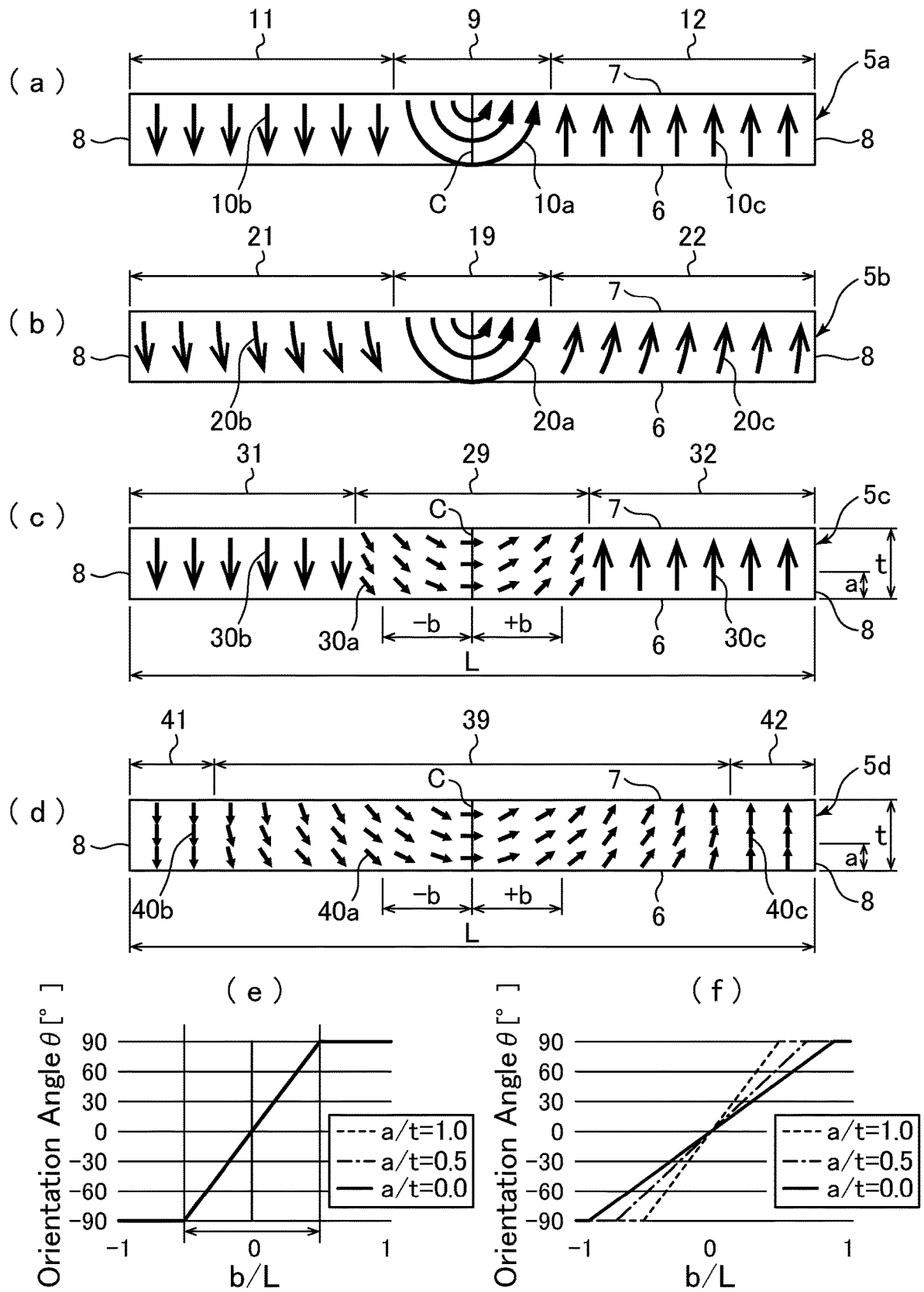

As depicted in FIG. 2, this magnet unit 1 is disposed in opposed relation to a stator 3 comprising an array of electromagnets composed of coils 3a, 3b, 3c each wound around an iron core. In this state, the back yoke 2 is disposed on a side opposite to the stator 3 across the permanent magnets 1a, 1b FIG. 3 is a schematic diagram depicting rare-earth permanent magnet-forming sintered bodies 5a, 5b, 5c, 5d according to four different embodiments of the present invention, in order to explain a concept of the present invention. FIG. 3(a) and FIG. 3(b) are, respectively, lengthwise cross-sectional views depicting the rare-earth permanent magnet-forming sintered body 5a according to a first embodiment of the present invention and the rare-earth permanent magnet-forming sintered body 5b according to a second embodiment of the present invention, and FIG. 3(c) and FIG. 3(d) are, respectively, lengthwise cross-sectional views depicting the rare-earth permanent magnet-forming sintered body 5c according to a third embodiment of the present invention and the rare-earth permanent magnet-forming sintered body 5d according to a fourth embodiment of the present invention. In the first embodiment depicted in FIG. 3(a), the permanent magnet-forming sintered body 5a is a product obtained by sintering particles of a rare-earth permanent magnet material such as a Nd—Fe—B based magnet material, and has a first surface 6 extending in a length direction along a length L thereof, a second surface 7 lying at a distance corresponding to a thickness t thereof, from the first surface 6 in a thickness direction thereof and extending in the length direction. Each of lengthwise opposite ends of the sintered body 5a is formed to have an edge surface 8. Although not illustrated in FIG. 3(a), the sintered body 5a has a widthwise dimension (width) W, as with the permanent magnets 1a, 1b. That is, the sintered body 5 generally has a parallelepiped shape, and, in the case where the sintered body 5a is used in a linear motor for a reciprocating member, it can be formed to have a lengthwise dimension L and a widthwise dimension W similar to those described above in connection with FIG. 1.

In the sintered body 5a according to the first embodiment depicted in FIG. 3(a), in a central region 9 thereof extending from a lengthwise center line C toward each of the lengthwise opposite ends by a given length, easy magnetization axes 10a of magnet material particles (not depicted) included in the central region 9 are oriented in such a manner as to be directed along a path having an arch shape curved downwardly about a point of the lengthwise center line C on the second surface 7. Further, easy magnetization axes 10b of magnet material particles included in a first end region 11 extending from the central region 9 to the edge surface 8 of one of the lengthwise opposite ends are oriented in parallel alignment in such a manner as to be directed in approximately parallel to each other along a path which extends from the lengthwise-extending second surface 7 toward the lengthwise-extending first surface 6, and easy magnetization axes 10c of magnet material particles included in a second end region 12 extending from the central region 9 to the edge surface 8 of the other end are oriented in parallel alignment in such a manner as to be directed in approximately parallel to each other along a path which extends from the lengthwise-extending first surface 6 toward the lengthwise-extending second surface 7.

In the sintered body 5b according to the second embodiment depicted in FIG. 3(b), in a central region 19 thereof extending from the lengthwise center line C toward each of the lengthwise opposite ends by a given length, easy magnetization axes 20a of magnet material particles (not depicted) included in the central region 19 are oriented in such a manner as to be directed along a path having an arch shape curved downwardly about a point of the lengthwise center line C on the second surface 7. Differently from the sintered body 5a, easy magnetization axes 20b of magnet material particles included in a first end region 21 extending from the central region 19 to the edge surface 8 of one of the lengthwise opposite ends are oriented in such a manner as to be directed along a curved path which extends from the lengthwise-extending second surface 7 toward the lengthwise-extending first surface 6, while coming close to the central region 19 as becoming closer to the first surface 6, and easy magnetization axes 20c of magnet material particles included in a second end region 22 extending from the central region 19 to the edge surface 8 of the other end are oriented in such a manner as to be directed along a path which extends from the lengthwise-extending first surface 6 toward the lengthwise-extending second surface 7, while coming away from the central region 19 as becoming closer to the second surface 7.

In the sintered body 5c according to the third embodiment depicted in FIG. 3(c), in a central region 29 thereof extending from a lengthwise center line C toward each of the lengthwise opposite ends by a given length, easy magnetization axes 30a of magnet material particles (not depicted) included in the central region 29 are oriented in such a manner as to be inclined with respect to the first surface 6 at an inclination angle which gradually increases as a distance b from the lengthwise center line C becomes larger. More specifically, as depicted in FIG. 3(c), when a distance measured from an intersection point O of the lengthwise center line C and the first surface 6 in a direction from the intersection point O toward a first end region 31, a distance measured from the intersection point O in a direction toward a second end region 32, and a distance from the intersection point O to a boundary between the central region 29 and each of the first and second end regions 31, 32 are denoted, respectively, by "−b", "+b" and "bmax", an orientation angle θ as the inclination angle with respect to the first surface 6 is set to satisfy the following relationship: $\theta(°)=(b/bmax) \times c \times 90$ (where: c denotes a constant; and the orientation angle θ has a positive value and a negative value, respectively, in a counterclockwise direction and in a clockwise direction, wherein: $\theta=-90°$, when $(b/bmax) \times c < -1$; and $\theta=90°$, when $(b/bmax) \times c > 1$), wherein the orientation angle is approximately constant in the thickness direction at positions where the distance b from the lengthwise center line has a same value. In the first and second end regions 31, 32, easy magnetization axes 30b, 30c of the magnet material particles included in the end regions 31, 32 are oriented in parallel alignment.

In the sintered body 5d according to the fourth embodiment depicted in FIG. 3(d), in a central region 39 thereof extending from a lengthwise center line C toward each of the lengthwise opposite ends by a given length, easy magnetization axes 40a of magnet material particles (not depicted) included in the central region 39 are oriented in such a manner as to be inclined with respect to the first surface 6 at an inclination angle which gradually increases as a distance b from the lengthwise center line C becomes larger. Differently from the sintered body 5c, "c" in the formula defining the orientation angle θ of each easy magnetization axis 40a of the magnet material particles in this embodiment: $\theta(°)=(b/bmax) \times c \times 90$, is a coefficient which can take a different value according to a thicknesswise distance "a" from the first surface 6, instead of a constant. This relationship is presented by a graph depicted in FIG. 3(f). In this case, at lengthwise positions where the distance "b" has a same value, the orientation angle θ becomes smaller as the thicknesswise distance "a" becomes larger. In first and second end regions 41, 42, easy magnetization axes 40b, 40c of the magnet material particles included in the end regions 41, 42 are oriented in parallel alignment.

FIG. 4(a) depicts in detail the orientations of the easy magnetization axes 10a, 10b, 10c of the magnet material particles in the rare-earth permanent magnet-forming sintered body 5a according to the first embodiment in FIG. 3(a). In the central region 9, the easy magnetization axes 10a of the individual magnet material particles are oriented in such a manner as to be directed along an approximately arc-shaped or arch-shaped path which enters an inside of the sintered body 5a from the second surface 7 at positions on the side of the first end region 11 with respect to the lengthwise center line C, and, after passing inside of the sintered body 5a, reaches the second surface 7 again at positions on the side of the second end region 12 with respect to the lengthwise center line C. In the first end region 11, the easy magnetization axes 10b of the magnet material particles included in the first end region 11 are oriented in parallel alignment in such a manner as to be directed along approximately parallel paths each extending from the second surface 7 toward the first surface 6. On the other hand, in the second end region 12, the easy magnetization axes 10c of the magnet material particles included in the second end region 12 are oriented in parallel alignment in such a manner as to be directed along approximately parallel paths each extending from the first surface 6 toward the second surface 7.

In two corner areas 9a, 9b of the central region 9 adjacent, respectively, to the first and second end regions 11, 12 and close to the first surface 6, each of two groups of easy magnetization axes 10a1, 10a2 of the magnet material particles included, respectively, in the corner areas 9a, 9b is oriented along a curved path corresponding to the above arc-shaped or arch-shaped path.

A rare-earth permanent magnet obtained by magnetizing the rare-earth permanent magnet-forming sintered body 5a formed in the above manner is capable of generating a magnetic flux which circulates such that it exits from the first surface 6 in the first end region 11 to reach the first surface 6 in the second end region 12, and further exits from the second surface 7 in the second end region 12 to reach the second surface 7 in the first end region 11. That is, this permanent magnet can generate a high magnetic flux density without providing any back yoke.

FIG. 4(b) is a graph presenting an increased in magnetic flux density of an Nd—Fe—B based magnet pertaining to the first embodiment, in comparison with a conventional Nd—Fe—B based magnet. This comparison was performed with respect to an Nd—Fe—B based sintered magnet having the dimensions described in connection with FIG. 1. As mentioned above, a conventional sintered magnet, a sintered magnet has a thickness of 1.3 mm, and a back yoke having a thickness of 2 mm is attached to the sintered magnet. The graph in FIG. 4(b) indicates a magnetic flux generated by the magnet, in association with a distance from a lengthwise center thereof, wherein the curve a-1 represents a magnetic flux density in the conventional magnet as a comparative example. On the other hand, the curves b-1, b-2, b-3, b-4, b-5, b-6 and b-7 represent, respectively, magnetic flux densities in the Nd—Fe—B based magnet having no back yoke, pertaining to the first embodiment, when the thickness thereof was set, respectively, to 1.3 mm, 1.5 mm, 1.8 mm, 2.0 mm, 2.5 mm, 3.0 mm and 3.3 mm. As seen from this graph, in the magnet pertaining to the first embodiment, a peak magnetic flux density greater than that in the conventional magnet can be obtained even when the thickness is 1.3 mm, despite the structure having no back yoke. Further, when the thickness of the sintered body 5a is greater than 1.8 mm, it is possible to, despite having no back yoke, generate a magnet flux at a higher magnetic flux density over approximately the entire lengthwise length of the magnet, as compared to the magnet as the comparative example in which a total thickness of the back yoke and the sintered body is 3.3 mm. As seen in the curve b-7, the magnet having a thickness equal to the total thickness exhibits a magnetic flux density increased by 43% or more as compared to the comparative example.

Figure 5:
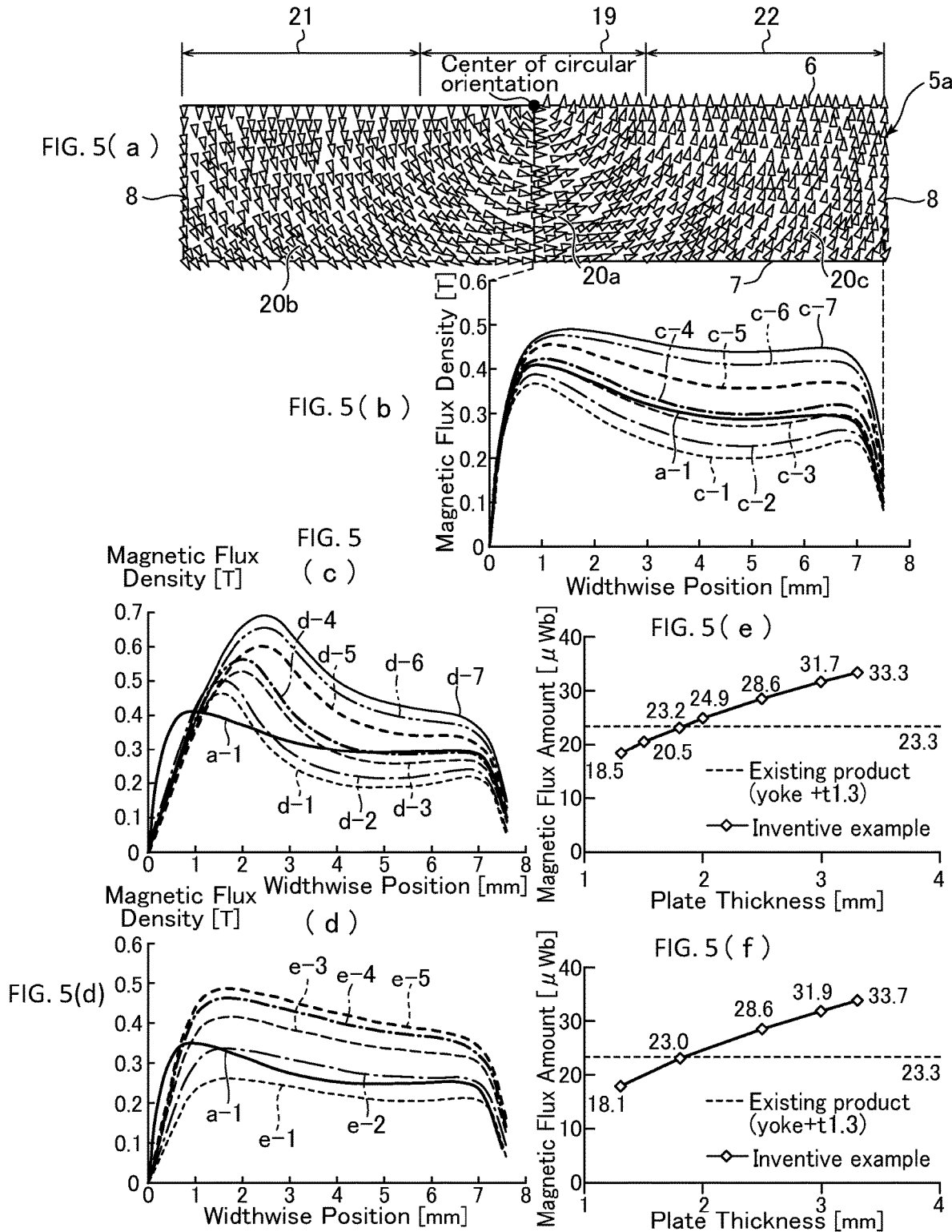
FIGS. 5(a) and 5(b) are, respectively, a side view and a graph corresponding to FIGS. 4(a) and 4(b) and relating to the embodiment depicted in FIG. 3(b)
FIGS. 5(c) and 5(d) are graphs corresponding to FIG. 4(b) and relating, respectively, to the embodiments depicted in FIGS. 3(c) and 3(d)
FIGS. 5(e) and 5(f) are graphs showing an increase in magnetic flux amount and relating, respectively, to the embodiments depicted in FIGS. 3(c) and 3(d).

FIG. 5(a) depicts in detail the orientations of the easy magnetization axes 20a, 20b, 20c of the magnet material particles in the rare-earth permanent magnet-forming sintered body 5a according to the second embodiment in FIG. 3(b). In the central region 19, the easy magnetization axes 20a of the individual magnet material particles are oriented in such a manner as to be directed along an approximately arc-shaped or arch-shaped path which enters an inside of the sintered body 5a from the second surface 7 at positions on the side of the first end region 21 with respect to the lengthwise center line C, and, after passing inside of the sintered body 5a, reaches the second surface 7 again at positions on the side of the second end region 22 with respect to the lengthwise center line C. In the first end region 21, the easy magnetization axes 20b of the magnet material particles included in the first end region 21 are oriented in such a manner as to be directed along a path extending from the second surface 7 toward the first surface. This path forms an arc-shaped curved line which extends from the second surface in a direction causing it to come close to the central region 19 as becoming closer to the first surface 6. On the other hand, in the second end region 22, the easy magnetization axes 20c of the magnet material particles included in the second end region 22 are oriented in such a manner as to be directed along an arc-shaped curved path which extends from the first surface 8 toward the second surface 7.

A rare-earth permanent magnet obtained by magnetizing the rare-earth permanent magnet-forming sintered body 5a formed in the above manner is capable of generating a magnetic flux which circulates such that it exits from the first surface 6 in the first end region 21 to reach the first surface 6 in the second end region 22, and further exits from the second surface 7 in the second end region 22 to reach the second surface 7 in the first end region 21, as with the aforementioned magnet pertaining to the first embodiment. Thus, this permanent magnet can also generate a high magnetic flux density without providing any back yoke.

FIG. 5(b) is a graph showing an increase in magnetic flux density of an Nd—Fe—B based magnet pertaining to the second embodiment, in comparison with the conventional Nd—Fe—B based magnet, in the same manner as that in FIG. 4(b), wherein the curve a-1 represents the magnetic flux density in the conventional magnet as a comparative example. On the other hand, the curves c-1, c-2, c-3, c-4, c-5, c-6 and c-7 represent, respectively, magnetic flux densities in the Nd—Fe—B based magnet having no back yoke, pertaining to the second embodiment, when the thickness thereof was set, respectively, to 1.3 mm, 1.5 mm, 1.8 mm, 2.0 mm, 2.5 mm, 3.0 mm and 3.3 mm. As seen from this graph, in the magnet pertaining to the second embodiment, a curve representing the magnetic flux density is relatively gently curved without exhibiting a notable peak as observed in the magnet pertaining to the first embodiment. Further, in the magnet pertaining to the second embodiment, when the thickness of the sintered body 5a is 1.8 mm, the magnet generates a magnetic flux density approximately equal to that in the magnet as the comparative example, and when the thickness of the sintered body 5a is greater than 1.8 mm, the magnet generates a higher magnetic flux density despite having no back yoke, as compared to the magnet as the comparative example in which a total thickness of the back yoke and the sintered body is 3.3 mm. As seen in the curve c-7, the magnet having a thickness equal to the total thickness exhibits a magnetic flux density increased by 39% or more as compared to the comparative example.

FIG. 5(c) is a graph showing an increase in magnetic flux density of an Nd—Fe—B based rare-earth permanent magnet produced by magnetizing the magnet-forming sintered body 5c according to the third embodiment in FIG. 3(c), in comparison with the conventional Nd—Fe—B based magnet, in the same manner as that in FIGS. 4(b) and 5(b), wherein the curve a-1 represents the magnetic flux density in the conventional magnet as a comparative example. On the other hand, the curves d-1, d-2, d-3, d-4, d-5, d-6 and d-7 represent, respectively, magnetic flux densities in the magnet having no back yoke, pertaining to the third embodiment, when the thickness thereof was set, respectively, to 1.3 mm, 1.5 mm, 1.8 mm, 2.0 mm, 2.5 mm, 3.0 mm and 3.3 mm. As seen from this graph, in the magnet pertaining to the third embodiment, a high peak appears in the magnetic flux density curve, so that this magnet is suitable for use in a reciprocating member-driving linear motor in which the moving direction of a movable element is changed in a relatively short cycle. FIG. 5(e) presents a relationship between the thickness t of the magnet pertaining to the third embodiment and the magnetic flux amount (µWb) generated by this magnet, in comparison with the conventional magnet. In FIG. 5(e), the broken line represents the magnetic flux amount in the conventional magnet, and the solid line represents the magnetic flux amount in the magnet pertaining to the third embodiment. Thus, it can be seen that, when the thickness is greater than 1.8 mm, the magnet pertaining to the third embodiment can bring out a magnetic flux amount greater than that in the conventional magnet.

FIG. 5(d) is a graph showing an increase in magnetic flux density of an Nd—Fe—B based rare-earth permanent magnet produced by magnetizing the magnet-forming sintered body 5d according to the fourth embodiment in FIG. 3(d), in comparison with the conventional Nd—Fe—B based magnet, in the same manner as that in FIGS. 4(b) and 5(b), wherein the curve a-1 represents the magnetic flux density in the conventional magnet as a comparative example. On the other hand, the curves e-1, e-2, e-3, e-4 and e-5 represent, respectively, magnetic flux densities in the magnet having no back yoke, pertaining to the fourth embodiment, when the thickness thereof was set, respectively, to 1.3 mm, 1.8 mm, 2.5 mm, 3.0 mm and 3.3 mm. As seen from this graph, in the magnet pertaining to the fourth embodiment, the magnetic flux density curve has a relatively flat pattern. FIG. 5(f) presents a relationship between the thickness t of the magnet pertaining to the fourth embodiment and the magnetic flux amount (µWb) generated by this magnet, in comparison with the conventional magnet. In FIG. 5(f), the broken line represents the magnetic flux amount in the conventional magnet, and the solid line represents the magnetic flux amount in the magnet pertaining to the fourth embodiment. Thus, it can be seen that, when the thickness is greater than 1.8 mm, the magnet pertaining to the fourth embodiment can bring out a magnetic flux amount greater than that in the conventional magnet.

[Production Method for Rare-Earth Permanent Magnet-Forming Sintered Body]

Figure 7:
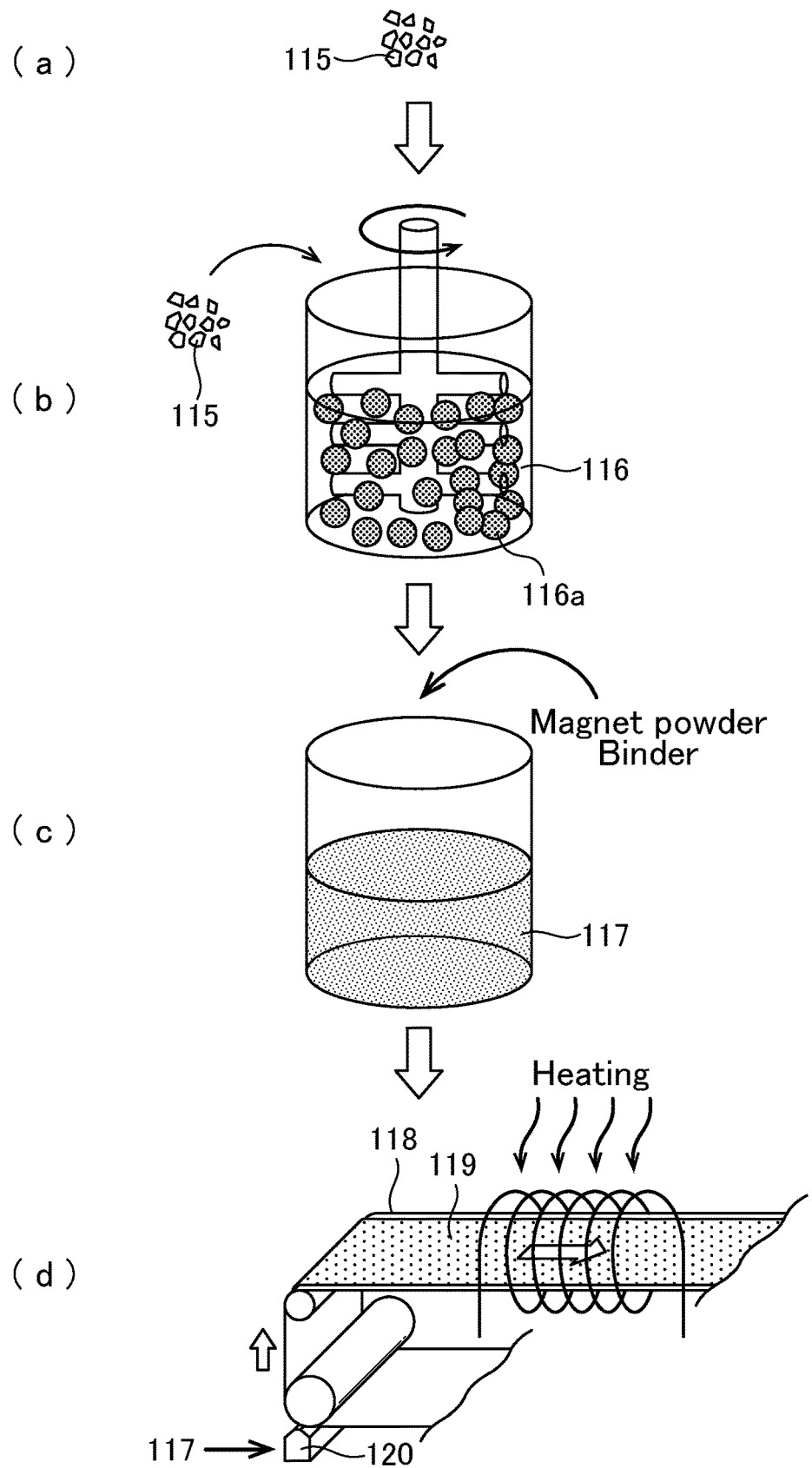

Next, with reference to FIG. 7, a production method for the rare-earth permanent magnet-forming sintered body 5a according to the first embodiment in FIG. 4(a) will be described. FIG. 7 is a schematic diagram depicting a production process of the permanent magnet-forming sintered body 5a according to the first embodiment.

First of all, an ingot of a magnet material comprised of an Nd—Fe—B based alloy having a given mixing ratio is produced by a casting process. Typically, the Nd—Fe—B based alloy usable for a neodymium magnet has a composition comprising 30 wt % of Nd, 67 wt % of Fe which is preferably electrolytic iron, and 1.0 wt % of B. Subsequently, this ingot is coarsely pulverized to a size of about 200 µm, using heretofore-known means such as a stamp mill or a crusher. Alternatively, the ingot may be melted and subjected to a strip casting process to produce flakes, and then the flakes may be coarsely powdered by a hydrogen cracking process. In this way, coarsely-pulverized magnet material particles 115 are obtained (see FIG. 7(a)).

Subsequently, the coarsely-pulverized magnet material particles 115 are finely pulverized by a heretofore-known pulverization method such as a wet process using a bead mill 116, or a dry process using a jet mill. For example, in the fine pulverization based on a wet process using a bead mill 116, a solvent is filled in the bead mill 116 charged with beads 116a as a pulverizing medium, and the coarsely-pulverized magnet material particles 115 is input into the solvent. Then, the coarsely-pulverized magnet material particles 115 are finely pulverized, in the solvent, to a particle size falling within a given range (e.g., 0.1 µm to 5.0 µm), to thereby disperse the resulting magnet material particles in the solvent (see FIG. 7(b)). Subsequently, the magnet material particles contained in the solvent after the wet pulverization are dried by drying mean such as vacuum drying, and the dried magnet material particles are extracted (not depicted). A type of solvent usable in the pulverization is not particularly limited. For example, it is possible to use: alcohols such as isopropyl alcohol, ethanol and methanol; esters such as ethyl acetate; lower hydrocarbons such as pentane and hexane; aromatics such as benzene, toluene and xylene; and ketones; and mixtures thereof. The solvent is not limited to an organic solvent. For example, it is possible to use a liquefied inert gas such as liquefied argon, and other inorganic solvents. In any case, it is preferable to use a solvent containing no oxygen atom therein.

On the other hand, in the fine pulverization based on a dry process using a jet mill, the coarsely-pulverized magnet material particles 115 are finely pulverized by the jet mill, in (a) an atmosphere consisting inert gas such as nitrogen gas, Ar gas or He gas, wherein an oxygen content of the inert gas is substantially 0%, or (b) an atmosphere consisting inert gas such as nitrogen gas, Ar gas or He gas, wherein an oxygen content of the inert gas is in the range of 0.001 to 0.5%, and formed as fine particles having an average particle size falling within a given range, such as 0.7 µm to 5.0 µm. As used herein, the term "the concentration of oxygen is substantially 0%" does not limitedly mean that the concentration of oxygen is absolutely 0%, but means that oxygen may be contained in an amount to an extent that it very slightly forms an oxide layer on surfaces of the fine particles.

Subsequently, the magnet material particles finely pulverized by the bead mill 116 or other pulverizing means are formed into a desired shape. For shaping of the magnet material particles, a mixture obtained by mixing the finely-pulverized magnet material particles 115 and a binder together is preliminarily prepared. As the binder, it is preferable to use a resin material. In the case where a resin is used as the binder, it is preferable to use a polymer containing no oxygen atom in its structure and having a depolymerization property. Further, it is preferable to use a thermoplastic resin so as to enable a residue of the mixture of the magnet material particles and the binder, occurring when the mixture is formed into a desired shape such as a rectangular parallelepiped shape, as described later, to be reused, and enable magnetic field orientation to be performed under a condition that the binder is softened as a result of heating the mixture. More specifically, a polymer is suitably used which comprises one or more polymers or copolymers formed from a monomer represented by the following general formula (1):

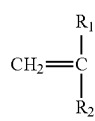

(1)

(where each of R1 and R2 denotes one of a hydrogen atom, a lower alkyl group, a phenyl group and a vinyl group.)

Examples of a polymer meeting the above conditions include: polyisobutylene (PIB) as a polymer of isobutylene; polyisoprene (isoprene rubber (IR)) as a polymer of isoprene; polybutadiene (butadiene rubber (BR)) as a polymer of 1,3-butadiene; polystyrene as a polymer of styrene; a styrene-isoprene-styrene block copolymer (SIS) as a copolymer of styrene and isoprene; butyl rubber (IIR) as a copolymer of isobutylene and isoprene; a styrene-butadiene-styrene block copolymer (SBS) as a copolymer of styrene and butadiene; a styrene-ethylene-butadiene-styrene copolymer (SEBS) as a copolymer of styrene, ethylene and butadiene; a styrene-ethylene-propylene-styrene copolymer (SEPS) as a copolymer of styrene, ethylene and propylene; an ethylene-propylene copolymer (EPM) as a copolymer of ethylene and propylene; EPDM obtained by copolymerizing diene monomers together with ethylene and propylene; polyethylene as a polymer of ethylene; polypropylene as a polymer of propylene; a 2-methyl-1-pentene polymerized resin as a polymer of 2-methyl-1-pentene; a 2-methyl-1-butene polymerized resin as a polymer of 2-methyl-1-butene; and an a-methylstyrene polymerized resin as a polymer of a-methylstyrene. A resin to be used as the binder may have a composition containing a polymer or copolymer of monomers containing an oxygen atom and/or a nitrogen atom (e.g., poly(butyl methacrylate) or poly(methyl methacrylate)) in a small amount. Further, a monomer which does not meet the general formula (1) may be partially copolymerized. Even in such a situation, it is possible to achieve the object of the present invention.

As a resin to be used as the binder, it is desirable, from a viewpoint of adequately performing magnetic field orientation, to use a thermoplastic resin capable of being softened at a temperature of 250° C. or less (i.e., having a softening temperature of 250° C. or less), more specifically a thermoplastic resin having a glass-transition temperature or flow starting temperature of 250° C. or less.

In order to disperse the magnet material particles over the thermoplastic resin, it is desirable to add a dispersant in an appropriate amount. As the dispersant, it is desirable to add at least one selected from the group consisting of alcohol, carboxylic acid, ketone, ether, ester, amine, imine, imide, amide, cyanogen, phosphorous functional group, sulfonic acid, a compound having an unsaturated bond such as a double bond or a triple bond, and a liquid, saturated hydrocarbon compound. Two or more of them may be used in the form of a mixture.

Further, in advance of aftermentioned operation of applying a magnetic field to the mixture of the magnet material particles and the binder to thereby magnetically orient the magnet material particles, the mixture is heated to allow such magnetic field orientation treatment to be performed under a condition that the binder component is softened.

By using a binder satisfying the above conditions to serve as the binder to be mixed with the magnet material particles, it is possible to reduce an amount of carbon and an amount of oxygen remaining in a rare-earth permanent magnet-forming sintered body after sintering. Specifically, an amount of carbon remaining in a rare-earth permanent magnet-forming sintered body after sintering can be reduced to 2000 ppm or less, more preferably 1000 ppm or less. Further, an amount of oxygen remaining in a rare-earth permanent magnet-forming sintered body after sintering can be reduced to 5000 ppm or less, more preferably 2000 ppm or less.

An addition amount of the binder is set to a value capable of, when shaping a slurry-form or heated and melted compound, filling gaps among the magnet material particles so as to provide improved thickness accuracy to a shaped body obtained as a result of the shaping. For example, a ratio of the binder to a total amount of the magnet material particles and the binder is set in the range of 1 wt % to 40 wt %, more preferably in the range of 2 wt % to 30 wt %, still more preferably in the range of 3 wt % to 20 wt %.

Figure 4:
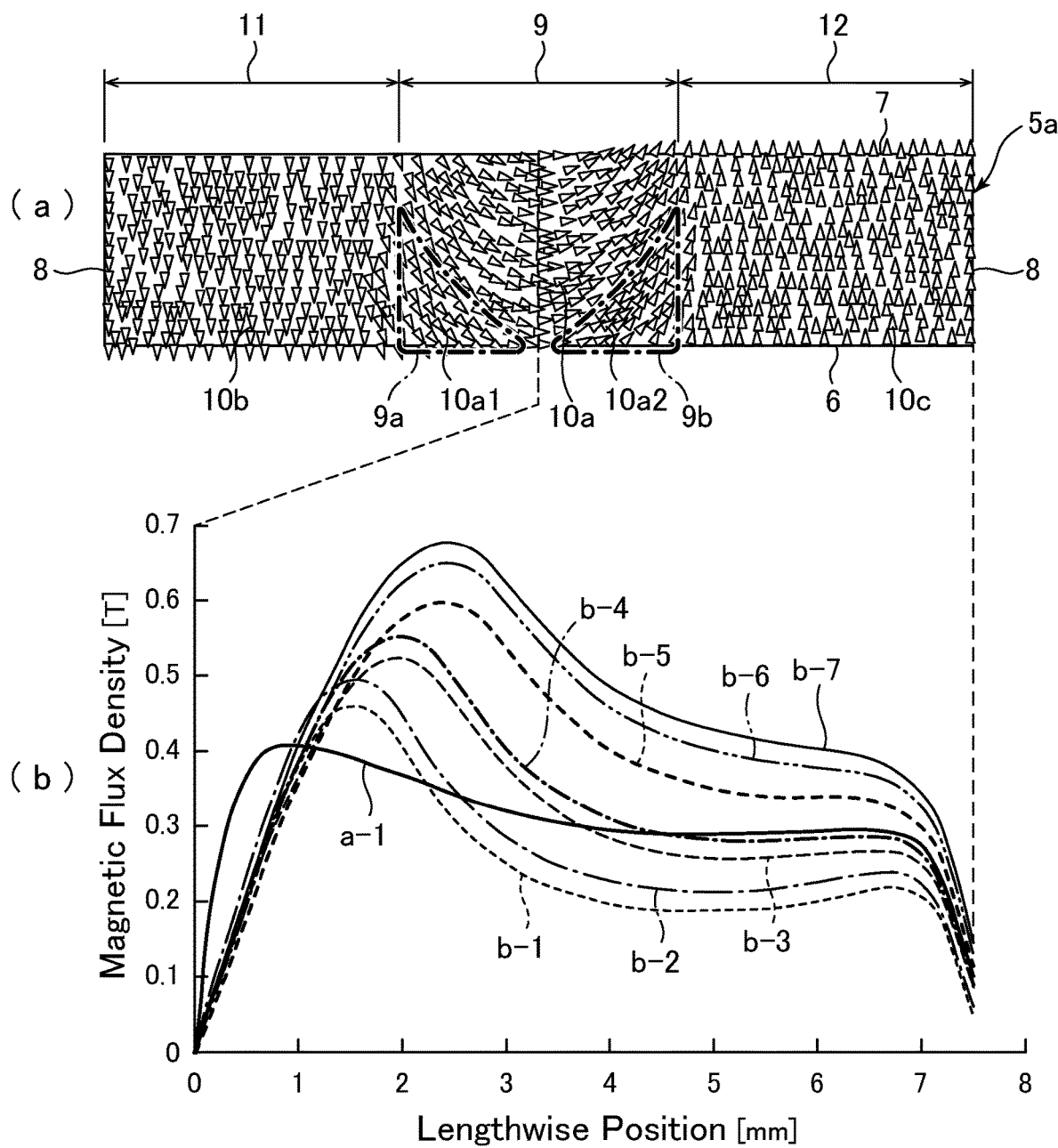

In the following example, the mixture is formed into a shape other than that of an intended product once, and a magnetic field is applied to the resulting shaped body to orient easy magnetization axes of the magnet material particles, whereafter the resulting shaped body is subjected to shaping and sintering to obtain a product having a desired shape as depicted, for example, in FIG. 4. Particularly, in the following example, the mixture comprising the magnet material particles and the binder, i.e., a compound 117, is formed into a sheet-like green (unprocessed or untreated) shaped body (hereinafter referred to as "green sheet") once, and then further formed into a shape for the orientation treatment. For forming the mixture, particularly, into a sheet shape, it is possible to employ a forming method using, for example, a hot-melt coating process which comprises heating the compound 117, i.e., the mixture of the magnet material particles and the binder, and then coating the resulting melt onto a substrate to thereby form the melt into a sheet shape, or a slurry coating process which comprises coating a slurry containing the magnet material particles, the binder and an organic solvent, on a substrate, to thereby form the slurry into a sheet shape.

In the following description, one example of the production process will be described in connection with formation of the green sheet using, particularly, the hot-melt coating process. However, the forming method in the present invention is not limited to such a specific coating process, but any other suitable process such as a hot-melt extrusion process using an extrusion die may be used.

Although the following description will be made about formation of the green sheet using, particularly, the hot-melt coating process, the forming method in the present invention is not limited to such a specific coating process.

A binder is mixed with the magnet material particles finely pulverized using the bead mill 116 or other pulverizing means, to prepare a clayey mixture comprising the magnet material particles and the binder, i.e., a compound 117, as mentioned above. In this process, it is possible to use, as the binder, a mixture of a resin and a dispersant as mentioned above. As one example of the binder, it is preferable to use a thermoplastic resin comprising a polymer containing no oxygen atom in its structure and having a depolymerization property. Further, as the dispersant, it is preferable to add at least one selected from the group consisting of alcohol, carboxylic acid, ketone, ether, ester, amine, imine, imide, amide, cyanogen, phosphorous functional group, sulfonic acid, and a compound having an unsaturated bond such as a double bond or a triple bond. As to an addition amount of the binder, in the compound 117 after addition of the binder, a ratio of the binder to a total amount of the magnet material particles and the binder is set in the range of 1 wt % to 40 wt %, more preferably in the range of 2 wt % to 30 wt %, still more preferably in the range of 3 wt % to 20 wt %, as mentioned above.

Further, an addition amount of the dispersant is preferably determined depending on a particle size of the magnet material particles, wherein it is recommended to increase the addition amount as the particle size of the magnet material particles becomes smaller. Specifically, the addition amount may be set in the range of 0.1 parts to 10 parts, preferably in the range of 0.3 parts to 8 parts, with respect to 100 parts of the magnet material particles. If the addition amount is excessively small, a dispersion effect becomes poor, possibly leading to deterioration in orientation property. On the other hand, if the addition amount is excessively large, the dispersant is likely to contaminate the magnet material particles. The dispersant added to the magnet material particles adheres onto surfaces of the magnet material particles, and acts to facilitate dispersion of the magnet material particles to provide the clayey mixture, and to assist turning of the magnet material particles in the aftermentioned magnetic field orientation treatment. As a result, it becomes possible to facilitate orientation during application of a magnetic field so as to uniform respective directions of easy magnetization axes of the magnet material particles, into approximately the same direction, i.e., so as to increase the degree of orientation. Particularly, in the case where the binder is mixed with the magnet material particles, the binder is present around the surfaces of the magnet material particles, so that a frictional force against the magnet material particles during the magnetic field orientation treatment is increased, thereby possibly leading to deterioration in orientation property of the magnet material particles. Thus, the effect arising from addition of the dispersant becomes more important.

Preferably, the mixing of the magnet material particles and the binder is performed in an atmosphere consisting of inert gas such as nitrogen gas, Ar gas or He gas. As one example, the mixing of the magnet material particles and the binder is performed by inputting the magnet material particles and the binder into a stirring machine and stirring them using the stirring machine. In this case, with a view to enhancing kneading performance, heating-stirring (stirring under heating) may be performed. It is also desirable to perform the mixing of the magnet material particles and the binder, in an atmosphere consisting of inert gas such as nitrogen gas, Ar gas or He gas. Particularly, in the case where the coarsely-pulverized magnet material particles are finely pulverized by a wet process, the compound 117 may be obtained by adding the binder to a solvent used for pulverization, without extracting the magnet material particles from the solvent, and, after kneading the resulting mixture, volatilizing the solvent.

Subsequently, the compound 117 is formed into a sheet shape to prepare the aforementioned green sheet. Specifically, in case of employing the hot-melt coating process, the compound 117 is heated and melted to have flowability, and then coated on a support substrate 118. Subsequently, the compound 117 is solidified according to heat dissipation to form a long strip-shaped green sheet 119 on the support substrate 118. In this case, although a temperature during heating and melting of the compound 117 varies depending on a type and an amount of a binder used, it is typically set in the range of 50 to 300° C. In this case, it is to be understood that the temperature needs to be set to a value greater than the flow starting temperature of the binder used. On the other hand, in case of employing the slurry coating process, a slurry obtained by dispersing the magnet material particles, the binder and optionally an additive for facilitating the orientation, over a large volume of solvent is coated on the support substrate 118. Subsequently, the slurry is subjected to drying to volatilize the solvent therefrom to thereby form a long strip-shaped green sheet 119 on the support substrate 118.

As a coating system for the melted compound 117, it is preferable to use a system having excellent layer thickness controllability, such as a slot-die system or a calender roll system. Particularly, in order to realize high thickness accuracy, it is desirable to use a die system or a comma coating system which is a system having particularly excellent layer thickness controllability, i.e., a system capable of coating a layer having a highly-accurate thickness, on a surface of a substrate. For example, in the slot-die system, the compound 117 after being heated to have flowability is pressure-fed from a gear pump into a die, and discharged from the die to perform coating. On the other hand, in the calender roll system, the compound 117 is fed into a nip gap between two heated rolls, in a controlled amount, and the rolls are rotated to coat the compound 117 melted by heat of the rolls, onto the support substrate 118. As one example of the support substrate 118, it is preferable to use a silicone-treated polyester film. Further, it is preferable to use a defoaming agent or perform a vacuum heating defoaming process to sufficiently defoam a layer of the coated and developed compound 117 so as to prevent gas bubbles from remaining in the layer. Alternatively, the melted compound 117 may be extruded onto the support substrate 118 while being formed into a sheet shape, by an extrusion forming or injection forming, instead of being coated on the support substrate 118, to thereby form the green sheet 119 on the support substrate 118.

In the example depicted in FIG. 7, coating of the compound 117 is performed using a slot-die 120. In a step of forming the green sheet 119 using this slot-die system, it is desirable to actually measure a sheet thickness of the coated green sheet 119, and adjust a nip gap between the slot-die 120 and the support substrate 118, by feedback control based on the actually-measured value. In this case, it is desirable to reduce a variation in an amount of the flowable compound 117 to be fed to the slot-die 120, as small as possible, e.g., to ±0.1% or less, and further reduce a variation in coating speed as small as possible, e.g., to ±0.1% or less. This control makes it possible to improve the thickness accuracy of the green sheet 119. As one example, with respect to a design value of 1 mm, the thickness accuracy of the green sheet 119 may be within ±10%, preferably within ±3%, more preferably within ±1%. In the calender roll system, a film thickness of the compound 117 to be transferred to the support substrate 118 can be controlled by feedback-controlling calendering conditions based on an actually-measured value in the same manner as that described above.

Preferably, the thickness of the green sheet 119 is set in the range of 0.05 mm to 20 mm. If the thickness is reduced to less than 0.05 mm, it becomes necessary to laminate a plurality of layers so as to achieve a required magnet thickness, resulting in deteriorated productivity.

Figure 6:
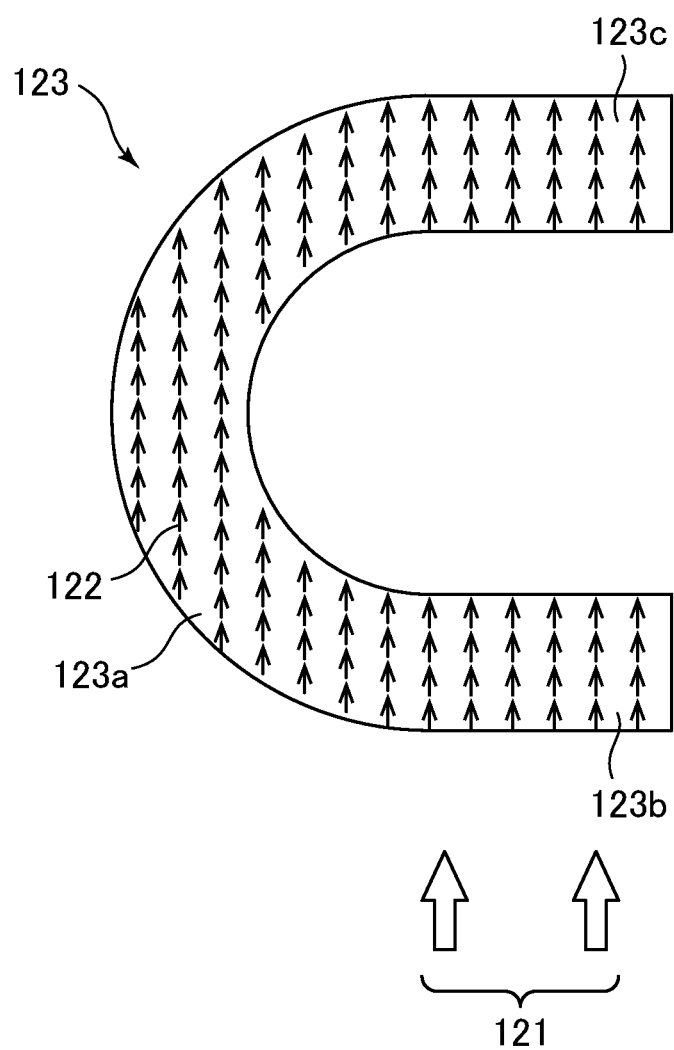
FIG. 6 is a side view depicting a state of magnetic field application in a process for producing a permanent magnet-forming sintered body having the orientations of the easy magnetization axes depicted in FIG. 4(a).

Subsequently, the green sheet 119 formed on the support substrate 118 by the hot-melt coating process is cut into a rectangular parallelepiped shape having a size corresponding to a desired magnet size to form a processing sheet piece, and this sheet piece is bent into a U shape as depicted in FIG. 6 to prepare a workpiece 123 to be subjected to magnetic field application. In this example, the workpiece 123 comprises a semicircular-shaped arc portion 123a, and two linear portions 123b, 123c each extending from a respective one of opposite ends of the arc portion 123a in a tangential direction. The arc portion 123 corresponds to the central region 9 of the permanent magnet-forming sintered body 5a to be finally obtained, and the end portions 123b, 123c correspond, respectively, to the first and second end regions 11, 12 of the sintered body 5a.

This workpiece 123 has a width dimension in a direction orthogonal to the drawing sheet surface, and this width dimension, a thickness dimension and a length dimension thereof are set in consideration of a dimensional shrinkage during an aftermentioned sintering step, i.e., to enable the desired magnet size to be obtained after the aftermentioned sintering step.

A parallel magnetic field 121 is applied to the processing sheet piece 123 depicted in FIG. 6, in a direction orthogonal to surfaces of the linear portions 123b, 123c. Through this magnetic field application, easy magnetization axes of the magnet material particles included in the workpiece 123 are oriented in the direction of the magnetic field, as depicted by the arrowed lines 122 in FIG. 6. Specifically, the workpiece 123 is placed in a magnetic field application die (not depicted) having a cavity having a shape corresponding to that of the workpiece 123, and heated to soften the binder contained in the workpiece 123. More specifically, the workpiece 123 is heated until a storage elastic modulus of the binder contained in the workpiece 123 becomes $10^8$ Pa or less, preferably $10^7$ Pa or less, to thereby soften the binder. This enables the magnet material particles to be turned within the binder, i.e., enables the easy magnetization axes of the magnet material particles to be oriented in directions along the parallel magnetic field 121.

In this process, although a temperature and a time for heating the workpiece 123 vary depending on a type and an amount of a binder used, they may be set, respectively, to 40 to 250° C. and 1 to 60 minutes, for example. In either case, for softening the binder contained in the workpiece 123, the heating temperature needs to be set to a value equal to or greater than a glass-transition temperature or flow starting temperature of the binder used. Examples of a means to heat the workpiece 123 include a heating system using a hot plate, and a system using, as a heat source, a heating medium such as silicone oil. A magnetic field intensity during the magnetic field application may be set in the range of 5000 [Oe] to 150000 [Oe], preferably in the range of 10000 [Oe] to 120000 [Oe]. As a result, the easy magnetization axes of the magnet material particles included in the workpiece 123 are oriented in parallel alignment in directions along the parallel magnetic field 121, as depicted in FIG. 6. This magnetic field application step may be configured such that a magnetic field is simultaneously applied to a plurality of the processing sheet pieces 123. In this case, the parallel magnetic field 121 may be simultaneously applied, using a die having a plurality of cavities or a plurality of dies arranged side-by-side. The step of applying a magnetic field to the workpiece 123 may be performed in concurrence with the heating step, or during a period after completion of the heating step and before solidification of the binder of the workpiece 123.

Subsequently, the workpiece 123 in which the easy magnetization axes of the magnet material particles thereof are oriented in parallel alignment as indicated by the arrowed line 122 through the magnetic field application step depicted in FIG. 6 is extracted from the magnetic field application die, and transferred into a final shaping die having a rectangular-shaped cavity 124 having an elongate length dimension, so as to be shaped into a sintering workpiece. Through this shaping, the workpiece 123 is shaped such that the arc portion 123a is deformed into a shape corresponding to the linear central region 9, and simultaneously the linear portions 123b, 123c are linearly aligned with the central region. In the sintering workpiece formed through the shaping step, easy magnetization axes of magnet material particles included in a region corresponding to the central region 9 are oriented in such a manner as to be directed along the arc-shaped path as depicted in FIG. 4(a). Further, easy magnetization axes of magnet material particles included in each of the linear portions corresponding to the end regions 11, 12 are oriented in parallel alignment in such a manner as to be directed along thicknesswise parallel paths, as depicted in FIG. 4(a).

The oriented sintering workpiece in which the easy magnetization axes of the magnet material particles thereof are oriented in the above manner is subjected to calcining treatment in a non-oxidizing atmosphere adjusted at atmospheric pressure, or a pressure greater or less than atmospheric pressure (e.g., at 1.0 Pa or 1.0 MPa) at a decomposition temperature of the binder for a holding time of several hours to several ten hours (e.g., 5 hours). In this treatment, it is recommended to use a hydrogen atmosphere or a mixed gas atmosphere of hydrogen and inert gas. In the case where the calcining treatment is performed in a hydrogen atmosphere, a supply amount of hydrogen during the calcining treatment is set, for example, to 5 L/min. The calcining treatment makes it possible to remove organic compounds contained in the binder by decomposing the organic compounds to monomers by a depolymerization reaction or other reactions, and releasing the monomers. That is, decarbonizing which is treatment for reducing an amount of carbon remaining in the sintering sheet piece 125 is performed. Further, it is preferable to perform the calcining treatment under conditions which enable the amount of carbon remaining in the sintering sheet piece 125 to become 2000 ppm or less, preferably 1000 ppm or less. This makes it possible to densely sinter the entire sintering sheet piece 125 through subsequent sintering treatment to thereby suppress lowering of residual magnetic flux density and coercive force. In the case where a pressurization condition during the calcining treatment is set to a pressure greater than atmospheric temperature, it is desirable to set the pressure to 15 MPa or less. Further, the pressurization condition may be set to a pressure greater than atmospheric temperature, more specifically, to 0.2 MPa or more. In this case, an effect of reducing an amount of residual carbon can be particularly expected.

The binder decomposition temperature may be set based on a result of analysis of binder decomposition products and decomposition residues. Specifically, it is recommended to select a temperature range in which, when binder decomposition products are collected, no decomposition product other than monomers is observed, and, in analysis of residues, no product resulting from a side reaction of a residual binder component is detected. Although the binder decomposition temperature varies depending on a type of a binder, it may be set in the range of 200° C. to 900° C., preferably in the range of 40° C. to 600° C., e.g., to 450° C.

Figure 9:
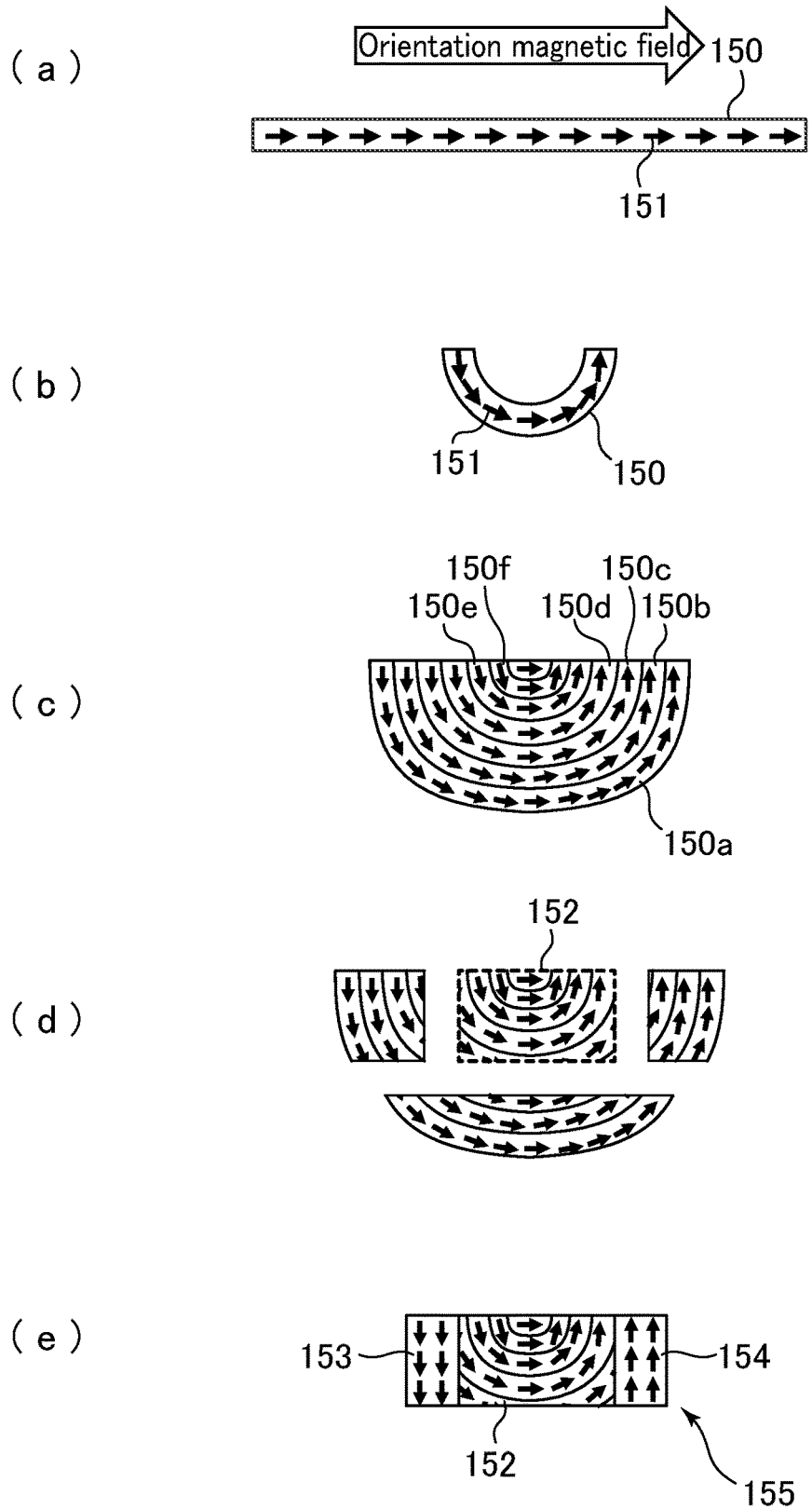

In the above calcining treatment, it is preferable to set a temperature rising speed to a smaller value, as compared to typical sintering treatment of a rare-earth magnet. Specifically, the temperature rising speed may be set to 2° C./min or less, e.g., 1.5° C./min. In this case, a good result can be obtained. Thus, the calcining treatment is performed such that a calcining temperature is increased at a given temperature rising speed of 2° C./min or less as depicted in FIG. 9, and, after reaching a predetermined setup temperature (binder decomposition temperature), held at the setup temperature for several hours to several ten hours. As above, the temperature rising speed in the calcining treatment is set to a relatively small value, so that carbon in the entire sintering sheet piece 125 is removed in a step-by-step manner without being rapidly removed. This makes it possible to reduce an amount of residual carbon to a sufficient level to thereby increase the density of a permanent magnet-forming sintered body after sintering. That is, by reducing the amount of residual carbon, it is possible to reduce voids in a permanent magnet. When the temperature rising speed is set to about 10° C./min as mentioned above, the density of a permanent magnet-forming sintered body after sintering can be increased to 98% or more (7.40 g/cm³ or more), and high magnet properties can expected in a magnet after magnetization.

Subsequently, treatment for sintering the sintering workpiece calcined by the calcining treatment, i.e., sintering treatment, is performed. In this example, as the sintering treatment, it is preferable to employ a uniaxial pressing-sintering method which comprises sintering the sintering workpiece while uniaxially pressing the sintering workpiece in the width direction, although an in-vacuum non-pressurized sintering method may be employed. In this method, the sintering work piece 125 is loaded in a sintering die (not depicted) with a cavity having the same shape as that depicted in FIG. 4(a). The, after closing the die, the sintering work piece is sintered while being pressed in the width direction. As this pressing-sintering technique, it is possible to employ any heretofore-known techniques such as hot press sintering, hot isostatic press (HIP) sintering, ultrahigh pressure synthesis sintering, gas pressure sintering, and spark plasma sintering (SPS). In particular, it is preferable to employ the SPS in which a pressure can be applied in a uniaxial direction, and sintering is performed by electric current sintering.

In the case where the sintering is performed by the SPS, it is preferable to perform the sintering, for example, at a pressing pressure of 0.01 to 100 MPa, in a vacuum atmosphere at a pressure of several Pa or less, wherein a furnace temperature is increased up to 940° C. at a temperature rising speed of 10° C./min, and then held for 5 minutes. Subsequently, after cooling the workpiece, a heat treatment is performed again in which the furnace temperature is increased up to 300° C. to 1000° C., and held at the temperature for 2 hours. As a result of the above sintering treatment, the rare-earth permanent magnet-forming sintered body 5a having the easy magnetization axes depicted in FIG. 4(a) are produced from the sintering workpiece. As above, the uniaxial pressing-sintering method in which the sintering workpiece is sintered while being pressed in the width direction makes it possible to suppress a change in orientations of the easy magnetization axes imparted to the magnet material particles in the sintering workpiece For producing the rare-earth permanent magnet-forming sintered body having the easy magnetization axes depicted in FIG. 5(a), a semicircular-shaped workpiece consisting only of the arc portion 123a and devoid of the linear portions 123b, 123c can be used, instead of the workpiece 123 depicted in FIG. 6, to obtain a sintered body having easy magnetization axes generally oriented in such a manner as to be directed along an arc-shaped path. In this case, the workpiece may be formed such that a curvature radius of each end thereof gradually increases toward an edge of the end. This enables a curved path in the end region to have a curvature radius different from that of the arc-shaped path in the central region.

FIG. 8 depicts one example of a small-size linear motor 140 which comprises a movable element 130 equipped with a permanent magnet 131 formed by magnetizing the rare-earth permanent magnet-forming sintered body 5a according to the first embodiment, and a movable element 132 disposed in opposed relation to the movable element 130. In the movable element 130, two permanent magnets 131 pertaining to the first embodiment are arranged in parallel in such a manner that opposed magnetic poles thereof have opposite polarities, to form a magnet array. A driven member 134 to be driven by the linear motor 140 is attached to the magnet array. In the stator 132, a plurality of coils 133a, 133b, 133c each wound around an iron core are arranged at intervals in a moving direction of the movable element 130 indicated by the double arrowed line 141. The configuration itself of this linear motor is a commonly used configuration, and therefore its detailed description will be omitted. A rare-earth permanent magnet pertaining to one embodiment of the present invention is capable of ensuring high magnetic flux density without using any back yoke, so that it becomes possible to reduce a thickness of a permanent magnet unit as compared to conventional permanent magnets, and significantly increase a power output of a linear motor, when compared to a conventional permanent magnet unit having the same thickness.

FIG. 9 depicts one example of a method for producing the rare-earth permanent magnet-forming sintered body 5d having the easy magnetization axes depicted in FIG. 3(d). FIG. 9(a) depicts an initial step in which a plurality of thin green sheets 150 are formed in the same manner as that in the step depicted in FIG. 7(d). Each of the green sheets 150 contains magnetic material particles each having an easy magnetization axis 151 oriented in a length direction of the green sheet 150. The green sheet 150 is bent into a shape similar to a U shape, as depicted in FIG. 9(b). In this step, a plurality of green sheets 150a to 150f having different curvature radii are prepared. Then, as depicted in FIG. 9(c), the plurality of green sheets 150a to 150f are laminated and thermally bonded together. Subsequently, a necessary area in a central region of the laminate is cut out as depicted in FIG. 9(d) to form a central portion 152. Subsequently, two green sheets 153, 154 formed to have easy magnetization axes oriented in parallel alignment are laminated and thermally bonded, respectively, to lengthwise opposite ends of the central portion 152 obtained in the step in FIG. 9(d), to thereby form a shaped body 155. Last of all, the permanent magnet-forming sintered body 5d depicted in FIG. 3(d) can be obtained by sintering the shaped body 155 obtained in the step in FIG. 9(e). By appropriately setting a bent shape in the bending step in FIG. 9(b), it is possible to desirably set orientations of easy magnetization axes of magnet material particles included in the central region 152 to be cut out in the step depicted in FIG. 9(d). Thus, the sintered body depicted in FIG. 3(c) can also be formed in the same manner.

Although the present invention has been described in connection with specific embodiments thereof, the present invention is not limited to such specific embodiments, but any other embodiment encompassed within the technical idea set forth in the appended claims should be also included in the present invention.

LIST OF REFERENCE SIGNS

1: magnet unit
1a, 1b: permanent magnet
2: back yoke
3: stator
3a, 3b, 3c: coil
5a, 5b: rare-earth permanent magnet-forming sintered body
6: first surface
7: second surface
8: edge surface
9, 19: central region
10a, 10b, 10c, 20a, 20b, 20c: easy magnetization axis
11, 21: first end region
12, 22: second end region
115: coarsely-pulverized magnet material particles
116: bead mill
117: compound
119: green sheet
120: slot-die
121: parallel magnetic field
123: workpiece
130: movable element
131: permanent magnet
132: stator
133a, 133b, 133c: coil
140: linear motor
L: lengthwise dimension
W: widthwise dimension
t: thickness
C: lengthwise center line

The invention claimed is:
1. A rare-earth permanent magnet-forming sintered body comprising magnet material particles containing a rare-earth substance, wherein the magnet material particles are integrally sintered while being formed into a single sintered body having a given three-dimensional shape with a lengthwise cross-section having a length defined by the opposite edge surfaces at the opposite ends of the lengthwise cross-section, said sintered body having a first surface extending in a length direction thereof, a second surface lying at a distance from the first surface in a thickness direction thereof and extending in the length direction, and an edge surface of each of lengthwise opposite ends thereof, wherein:
in a central region of the sintered body located between a first end region and a second end region on the respective sides of the opposite ends, when viewed in the length direction, easy magnetization axes of the magnet material particles included in the central region are oriented in such a manner as to be directed along a path which enters an inside of the sintered body from the second surface at a position located on the side of the first end region with respect to a lengthwise center line of the central region passing through a lengthwise center of the central region and extending in a direction perpendicular to the first surface, and, after intersecting the lengthwise center line in the length direction, extends toward the second surface at a position located on the side of the second end region with respect to the lengthwise center line of the central region;
in the first end region, easy magnetization axes of the magnet material particles included in the first end region are oriented in such a manner as to be directed along a path which enters the inside of the sintered body from the second surface and extends toward the first surface;
in the second end region, easy magnetization axes of the magnet material particles included in the second end region are oriented in such a manner as to be directed along a path which enters the inside of the sintered body from the first surface and extends toward the second surface;
the easy magnetization axes of the magnet material particles included in the first and second end regions are oriented in parallel alignment in such a manner as to be directed in a direction approximately orthogonal to the first surface; and the easy magnetization axes of the magnet material particles included in the central region are oriented such that, when the lengthwise center line of the central region is set as an origin in the length direction:
  a distance measured from the lengthwise center line in a direction toward the second end region is denoted by a positive value for a variable b,
  a distance measured from the lengthwise center line in a direction toward the first end region is denoted by a negative value for the variable b,
  a distance from the center line to a boundary between the central region and each of the first and second end regions is denoted by bmax, where bmax is the absolute value of the distance from the center line to the boundary between the central region and each of the first and second regions, and
  an orientation angle θ defined as an angle between an orientation direction of each of the easy magnetization axes and the first surface satisfies the following relationship:
  θ(°)=(b/bmax)×c×90 (where: c denotes a constant; and the orientation angle θ has a positive value and a negative value, respectively, in a counterclockwise direction and in a clockwise direction, wherein: θ=−90° when (b/bmax)×c<−1; and θ=90° when (b/bmax)×c>1),
  wherein the orientation angle is approximately constant in the thickness direction at positions where the distance b from the lengthwise center line has a same value.

2. The rare-earth permanent magnet-forming sintered body as recited in claim 1, wherein the easy magnetization axes of the magnet material particles included in the first end region are oriented in parallel alignment in such a manner as to be directed in a direction approximately orthogonal to the second surface.

3. The rare-earth permanent magnet-forming sintered body as recited in claim 1, wherein the easy magnetization axes of the magnet material particles included in the second end region are oriented in parallel alignment in such a manner as to be directed in a direction approximately orthogonal to the second surface.

4. The rare-earth permanent magnet-forming sintered body as recited in claim 1, wherein the easy magnetization axes of the magnet material particles included in the first end region are oriented, in an area adjacent to the central region, in such a manner as to be directed along a path which inclines in a direction causing it to come close to the central region as becoming closer to the first surface.

5. The rare-earth permanent magnet-forming sintered body as recited in claim 1, wherein the easy magnetization axes of the magnet material particles included in the second end region are oriented, in an area adjacent to the central region, in such a manner as to be directed along a path which inclines in a direction causing it to come away from the central region, as becoming farther away from first surface.

6. The rare-earth permanent magnet-forming sintered body as recited in claim 1, wherein the magnet material particles are particles of Nd—Fe—B based magnet material.

7. A rare-earth permanent magnet produced by magnetizing the rare-earth permanent magnet-forming sintered body as recited in claim 1.

8. A linear motor comprising a movable element having the rare-earth permanent magnet as recited in claim 7, and a plurality of stationary magnetic poles arranged at a distance with respect to the first surface of the rare-earth permanent magnet.

9. The linear motor as recited in claim 8, wherein the rare-earth permanent magnet of the movable element is disposed such that the length direction thereof becomes parallel to a moving direction of the movable element.

10. A rare-earth permanent magnet-forming sintered body comprising magnet material particles containing a rare-earth substance, wherein the magnet material particles are integrally sintered while being formed into a single sintered body having a given three-dimensional shape with a lengthwise cross-section having a length defined by the opposite edge surfaces at the opposite ends of the lengthwise cross-section, said sintered body having a first surface extending in a length direction thereof, a second surface lying at a distance from the first surface in a thickness direction thereof and extending in the length direction, and an edge surface of each of lengthwise opposite ends thereof, wherein:
  in a central region of the sintered body located between a first end region and a second end region on the respective sides of the opposite ends, when viewed in the length direction, easy magnetization axes of the magnet material particles included in the central region are oriented in such a manner as to be directed along a path which enters an inside of the sintered body from the second surface at a position located on the side of the first end region with respect to a lengthwise center line of the central region passing through a lengthwise center of the central region and extending in a direction perpendicular to the first surface, and, after intersecting the lengthwise center line in the length direction, extends toward the second surface at a position located on the side of the second end region with respect to the lengthwise center line of the central region;
  in the first end region, easy magnetization axes of the magnet material particles included in the first end region are oriented in such a manner as to be directed along a path which enters the inside of the sintered body from the second surface and extends toward the first surface;
  in the second end region, easy magnetization axes of the magnet material particles included in the second end region are oriented in such a manner as to be directed along a path which enters the inside of the sintered body from the first surface and extends toward the second surface;
  the easy magnetization axes of the magnet material particles included in the first and second end regions are oriented in parallel alignment in such a manner as to be directed in a direction approximately orthogonal to the first surface; and
  the easy magnetization axes of the magnet material particles included in the central region are oriented such that, when the lengthwise center line of the central region is set as an origin in the length direction:
    a distance measured from the lengthwise center line in a direction toward the second end region is denoted by a positive value for a variable b,
    a distance measured from the lengthwise center line in a direction toward the first end region is denoted by a negative value for the variable b,
    a distance from the center line to a boundary between the central region and each of the first and second end regions is denoted by bmax, where bmax is the absolute value of the distance from the center line to the boundary between the central region and each of the first and second regions, and an orientation angle $\theta$ defined as an angle between an orientation direction of each of the easy magnetization axes and the first surface satisfies the following relationship:

$\theta(°)=(b/bmax)\times c\times 90$ (where the orientation angle $\theta$ has a positive value and a negative value, respectively, in a counterclockwise direction and in a clockwise direction, wherein: $\theta=-90°$ when $(b/bmax)\times c<-1$; and $\theta=90°$ when $(b/bmax)\times c>1$), wherein the c denotes a coefficient which varies to gradually increase along one direction from the first surface toward the second surface in the thickness direction, in such a manner that it becomes minimum at the first surface, and becomes maximum at the second surface.

* * * * *